(12) United States Patent
Howle

(10) Patent No.: US 7,922,779 B1
(45) Date of Patent: *Apr. 12, 2011

(54) CONCENTRATED DYE MATERIAL

(75) Inventor: Clint Howle, Wesley, AR (US)

(73) Assignee: American Decorative Concrete Supply Company, Inc., Lowell, AR (US)

( * ) Notice: Subject to any disclaimer, the term of this patent is extended or adjusted under 35 U.S.C. 154(b) by 39 days.

This patent is subject to a terminal disclaimer.

(21) Appl. No.: 11/811,461

(22) Filed: Jun. 11, 2007

Related U.S. Application Data

(63) Continuation-in-part of application No. 11/709,617, filed on Feb. 22, 2007.

(60) Provisional application No. 60/775,514, filed on Feb. 22, 2006.

(51) Int. Cl.
*D06P 3/80* (2006.01)
*C04B 7/02* (2006.01)

(52) U.S. Cl. ......... 8/522; 8/636; 8/527; 8/528; 106/713; 106/739; 106/741

(58) Field of Classification Search .............. 8/636, 522, 8/527, 528; 106/713, 739, 741
See application file for complete search history.

(56) References Cited

U.S. PATENT DOCUMENTS

| | | | |
|---|---|---|---|
| 4,162,348 A | 7/1979 | Juzu et al. | 428/474 |
| 5,476,722 A | 12/1995 | Sakamoto et al. | 428/511 |
| 5,534,214 A | 7/1996 | Sakamoto et al. | 264/333 |
| 5,951,752 A * | 9/1999 | Johansen et al. | 106/712 |
| 6,443,996 B1 * | 9/2002 | Mihelich et al. | 8/522 |
| 2003/0083396 A1 * | 5/2003 | Ylitalo et al. | 522/74 |
| 2007/0123638 A1 * | 5/2007 | Yang et al. | 524/556 |

OTHER PUBLICATIONS

Knovel Search, Hawley's Condensed Chemical Dictionary "Portland Cement" and "Concrete" entries, copyright 2002.*

* cited by examiner

*Primary Examiner* — Harold Y Pyon
*Assistant Examiner* — Katie Hammer
(74) *Attorney, Agent, or Firm* — Isaac A. Angres

(57) ABSTRACT

The invention herein provides for an improved dye material composed of a concentrated dye element for mixture with an aqueous element prior to application.

1 Claim, 2 Drawing Sheets

CONCENTRATED DYE MATERIAL

CROSS-REFERENCE TO RELATED APPLICATIONS

This application claims priority to and is a continuation-in-part of U.S. patent application Ser. No. 11/709,617, filed Feb. 22, 2007, entitled DYE MATERIAL, which claims priority to and is a continuation-in-part of U.S. provisional application Ser. No. 60/775,514, filed Feb. 22, 2006, entitled DYE MATERIAL.

STATEMENT REGARDING FEDERALLY SPONSORED RESEARCH OR DEVELOPMENT

Not Applicable.

REFERENCE TO A MICROFICHE APPENDIX

Not Applicable.

FIELD OF THE INVENTION

The invention relates to dye material used for treating existing surfaces, such as cured concrete. In particular, the invention pertains to concentrated dye material used for treating a variety of surfaces including concrete. Known art may be found in U.S. Class 428, subclass 511 and others.

BACKGROUND OF THE INVENTION

Dye compositions have been employed in the construction field to apply single colors and textures during the formation of surfaces. Similar technology has also been used to apply chemical formulas to create a desired finish upon a cured concrete surface. In the past, these dye materials have been limited to a single color base that included hazardous materials which complicate the shipping of these materials. Thus, shipping of multiple colors or combining colors required multiple hazardous material shipments. Furthermore, this created problems in adapting to varying color surfaces because adjustment could not be easily made to the formulation being applied. Additionally, the past dye formulations had a limited shelf-life that required concurrent ordering of the hazardous material dyes with the job such that custom coloring could not be easily provided. Thus, there is an overwhelming need in the art to provide an easily-transportable dye material that is not considered a hazardous material that also has an extended shelf-life. Furthermore, there is a need for the ability to provide materials that may be custom blended at the job site without the waste associated with prior art methods.

U.S. Pat. No. 4,162,348 to Juzu et al. shows a method for coloring inorganic substrates such as glass beads, glass fibers, mineral wool, rock wool, mineral fiber boards and cloths, concrete molded materials, inorganic dyes and metallic powders, which comprises treating the inorganic substrate with (1) a cationic component comprising (a) a water soluble cationic resin or an aqueous solution of a water soluble cationic resin, (b) an aqueous solution of a water soluble cationic resin and a water soluble cationic dye, or (c) an aqueous dispersion of a water soluble cationic resin, a cationic dispersing agent plus a water insoluble dye or pigment and, optionally, a cationic water soluble dye; and With (2) an anionic component comprising (d) an aqueous solution of a water soluble anionic dye, (e) an anionic dispersing agent or an aqueous solution of an anionic dispersing agent, (f) an aqueous solution of an anionic dispersing agent and a water soluble anionic dye, or (g) an aqueous dispersion of an anionic dispersing agent plus a water insoluble dye or pigment and, optionally, an anionic water soluble dye with the order of treatment with the cationic component (1) and the anionic component (2) being optional and with at least one of the cationic component (1) or the anionic component (2) containing a dye, either water soluble or water insoluble, or pigment as a colorant.

U.S. Pat. No. 5,476,722 to Sakamoto et al. shows a concrete coloring material and a process for coloring concrete by means of such a concrete coloring material capable of permitting concrete to exhibit natural color or aesthetic properties while preventing concrete from being substantially discolored. Polyethylene oxide is used as a water-soluble adhesive or glue. The oxide is mixed with a composition such as dye, pigment, a mixture thereof or the like, to thereby permit the composition to penetrate into the concrete.

U.S. Pat. No. 5,534,214 to Sakamoto et al. shows a concrete coloring material and a process for coloring concrete by means of such a concrete coloring material capable of permitting concrete to exhibit natural color or aesthetic properties while preventing concrete from being substantially discolored. Polyethylene oxide is used as a water-soluble adhesive or glue. The oxide is mixed with a composition such as dye, pigment, a mixture thereof or the like, to thereby permit the composition to penetrate into the concrete.

The prior art fails to teach a dye material shipped in its liquid concentrate form. Additionally, the prior art fails to teach a dye material with an extended shelf-life. Thus, there is a need in the art to provide a dye application that is easily transported, concentrated material, with an extended shelf-life.

SUMMARY OF THE INVENTION

The invention provides for an improved dye material used to treat existing surfaces, namely, cured concrete. The prior applications sold for dyeing cured concrete consist of a dye and acetone mixture packaged in a multiple-gallon material container.

A particular advantage of the proposed invention is that the concentrated dye material is transportable in smaller containers than typically used by the industry and may be stored for an extended period and then custom mixed with an aqueous material for application to existing concrete surfaces. The improved dye material eliminates the voluminous, cumbersome, weighty packaging materials used with previous dye materials for concrete surfaces.

Further, the concentrated dye material is an ideal for transportation and storage as it has an extended shelf-life. Packaging of the improved concentrated dye material is considerably more compact and lighter, allowing for more efficient shipping and storage of the dye material. This allows for multiple colors of dye to be easily transported for custom blending at the jobsite with the materials easily stored on the transportation vehicle with just a single transportation of a base liquid material.

An object of the present invention is to provide an improved dye material for treatment of existing surfaces.

Another object of the present invention is to provide a dye material that is easily transported.

Another object of the present invention is to provide a dye material which is compact and light.

A still further object of the present invention is to provide a method for providing on site custom blending without the multiple volumes of hazardous material required by the prior art.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

The present invention addresses a perceived need in the art for an improved dye material. In particular, the present invention discloses the use of a concentrated dye material for on site mixing with a base material for treatment of concrete surfaces.

Figure 1:
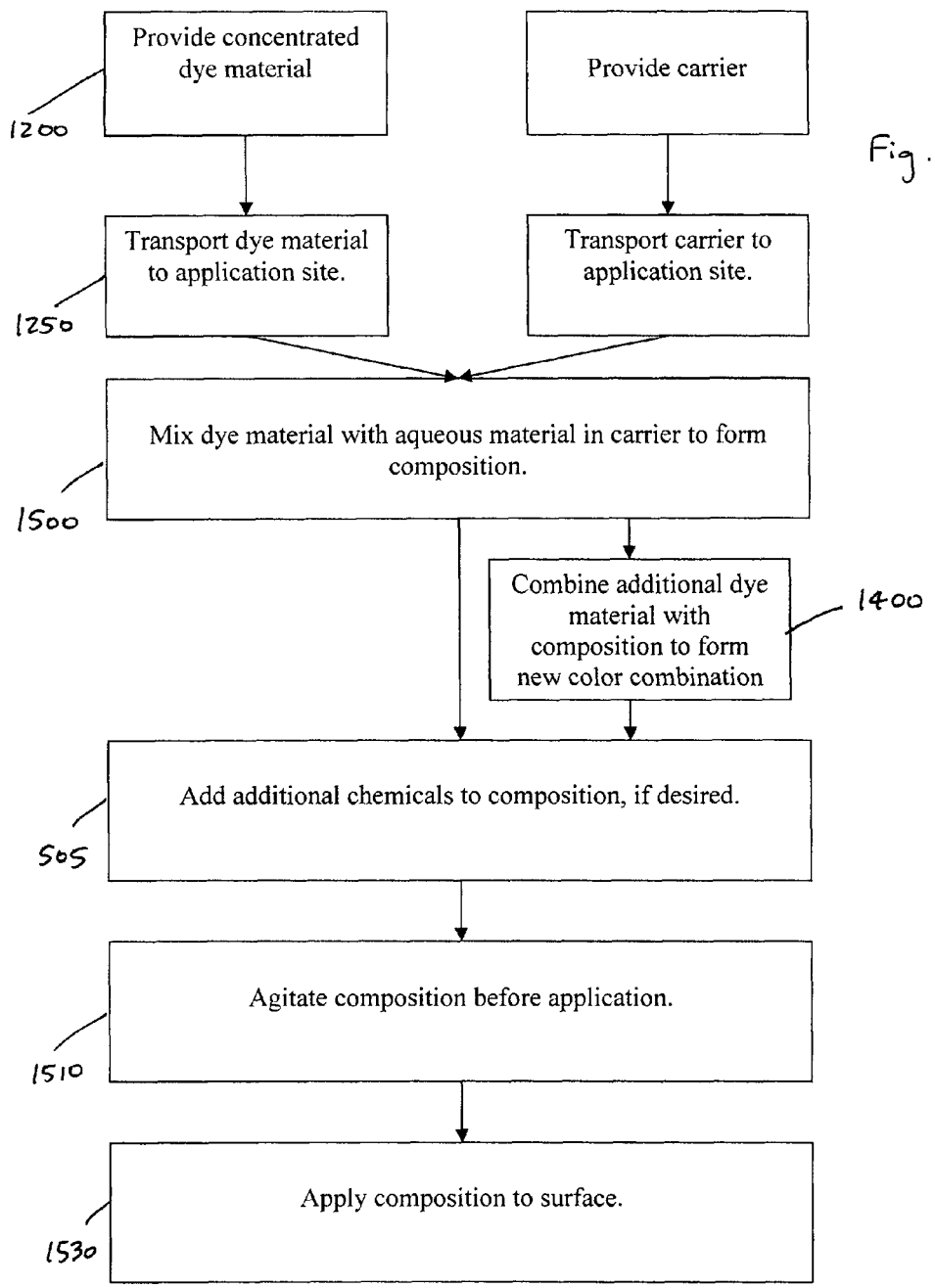
FIG. 1 is a flow chart illustrating a method of using the improved dye material.
Figure 2:
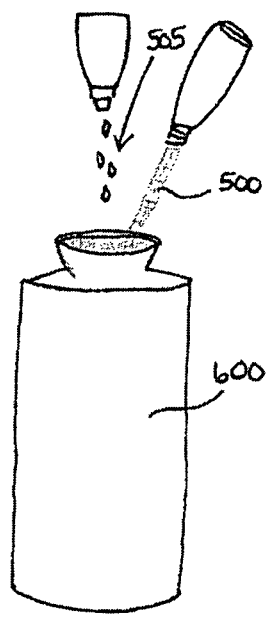
FIG. 2 is a drawing showing a step of the method of using the improved dye material.

FIG. 2 shows the main advantage of the present invention by showing the on site mixing of a concentrated dye material 100 with a chemical solution 500. The concentrate dye material in accordance with the present invention is generally indicated by reference numeral 100 in FIG. 2. The concentrate dye material 100 generally is added to an aqueous material 500 prior to application upon concrete surfaces. The aqueous material 500 may include a variety of solvents, such as acetone or water. Water is the preferred solvent.

The concentrated dye material 100, as shown in FIG. 2, is composed of a mixture of a defoamer to reduce foam upon mixing, various dyes to impart color, and two chemical, nonylphenol ethoxylate and diethylene glycol monobutyl ether. It is expected that the ratio of dyes of the dye material 100 can be altered to create differing colors. The concentration of dye of the concentrated dye material may vary between seven to thirteen percent. The concentration of defoamer weight of the concentrated dye material may vary between five to ten percent. The concentration of nonylphenol ethoxylate of the concentrated dye material may vary between twenty-five to thirty-five percent. The percentage of diethylene glycol monobutyl ether of the concentrated dye material may vary between forty-two to sixty-three percent.

Past applications of coloring systems are pigment-based and insoluble, therefore the material cannot penetrate the concrete surface, leaving pigments upon the surface of the concrete. The present invention is dye-based and soluble, thus allowing the dye material 100 to penetrate the surface of the concrete. The chemicals of the dye material 100 are adapted to promote the penetration of the dye into the concrete surface.

Figure 3:
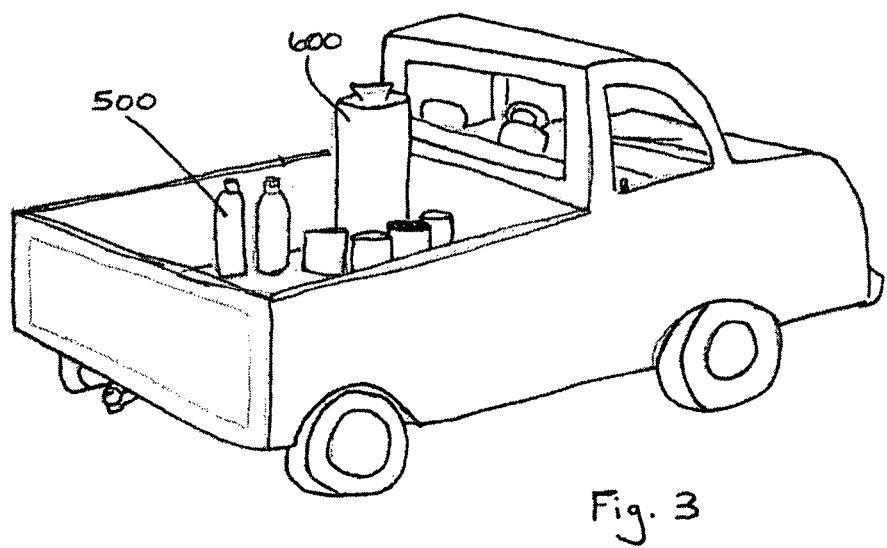
FIG. 3 is a drawing showing a step thereof.

As will be appreciated by one skilled in the art decorative concrete finishes may include many various colors requiring many differing dye materials. Also known is that concrete pads may have varying colors across their surfaces requiring the use of multiple color combinations to achieve a uniform dye effect. As shown in FIG. 3, the present invention provides for this capability while limiting the amount of aqueous material by providing a multitude of dye material 100 in a variety of colors that may be stored and shipped with a small volume of aqueous material 500. Alternatively, two shipments may be utilized wherein one is for the concentrated dye material and a second shipment is used for the aqueous material 500. This allows for multiple colors with just a single purchase and shipment of one amount of aqueous material 500.

The present invention allows for a user to purchase and use smaller lightweight amounts of concentrated dye material 100 for mixing with one base aqueous material 500. This advantage allows users to save storage space and money while promoting efficiency in the industry. Concentrated dye material 100 is packaged in smaller quantities, allowing for a less costly method of shipment and storage than aqueous dye materials or alternatively, allowing for faster shipment, such as air shipment, tunnel shipments, or the like, of materials to provide better customer service. Further, dye material 100 does not contain the voluminous aqueous elements used in the previous dye application until a few hours prior to surface application, so the concentrated dye material 100 is safer than dye materials containing acetone which lowers the risk to all of society in the transportation of these materials.

The dye material 100 is generally packaged in bottles 150, drums or other similar containers in a variety of sizes. As shown by the transportation truck in FIG. 3, the packaged dye material 100 can be easily stored for extended periods of time as the dye material 100 has an unlimited shelf life. A perceived benefit of the concentrated dye material 100 is an improved efficiency in the industry through the extended life of the dye material 100. Past aqueous dye materials containing acetone have a definite shelf-life allowing for waste in the industry.

Also shown in FIG. 3 is the effect of how the compact packaging of the concentrated dye material 100 allows for lighter, more efficient storage and shipping arrangements. Past dye materials have been cumbersome and weighty, as these materials include a hazardous aqueous solution, namely acetone. The present invention removes the heavy acetone element for transport and storage.

Prior to modification of a surface, dye material 100 must be provided 1200 and transported 1250 to the work site. As discussed, dye material 100 may be transported 1250 easily to a work site since it is compact. Additionally, multiple dye colors may be easily transported 1250 to the work site to allow for the use of multiple dye colors on the application surface or to allow for mixing of colors.

The concentrated dye material 100 is packaged into twelve ounce containers. The individual container is poured by the customer into a one gallon carrier. The carrier is then filled with tap water to fill the one gallon carrier, mixing 1500 approximately 116 ounces of water 500 to the twelve ounces of concentrated dye material to create a dye composition 1000. The concentrated dye material 100 may also be packaged into sixty ounce containers to be poured by the customer into a five gallon carrier.

Upon mixing 1500 with the aqueous material, the hue and color of the dye material 100 may be modified 1400 by adding differing colored dyes and more aqueous material. As an example, a yellow dye and a blue dye may be mixed to form a green dye. It is envisioned that a series of base colors may be used to form any desired color similar to the mixing of food dyes commonly found in recipes or paint colors commonly found in hardware stores. The user may modify the intensity of the hue of the dye composition by mixing less dye material 100 with the aqueous material. The mixture of aqueous material 500 with the dye material 100 can be in small or large quantities based upon the anticipated use of the dye composition 1000. Specifically, the user can chose the amount of dye material 100 to mix 1500 based upon the desired amount of dye composition 1000. In another embodiment, a user may select to mix 1500 a multitude of sizes including one quart, one gallon, and five gallon increments for mixture.

The color of the dye material 100 can be tested by mixing a small amount, such as seventeen milliliters of dye material 100 can be mixed 1500 with six ounces of aqueous material 500 to create a small amount of dye composition 1000. The amounts may also range between fifteen milliliters of dye material 100 to twenty milliliters of dye material 100 mixed with five ounces of aqueous material to ten ounces of aqueous material. This small amount of dye composition 1000 can then later be applied 1530 to a concrete surface to create a sample surface for inspection.

After mixing 1500 the dye material 100 to form the dye composition 1000, the dye composition 1000 should be agitated or shaken 1510 to encourage absorption of the dye material 100 by the aqueous material 500.

Dye composition 1000 can be applied 1530 to a variety of concrete surfaces after mixing. As will be appreciated by one in the art, concrete surfaces present a variety of finishes. Dye material 100 is suitable for use in a variety of concrete surfaces. These finishes include smooth finishes, polished finishes, splattered finishes, rough-floated finishes, broomed finishes, grooved finishes, stamped finishes, rubbed finishes, hammered aggregate finishes, exposed-stone finishes, and coarse-aggregate finishes. A benefit of the present invention is that the dye material 100 absorbs easily into the variety of possible surface finishes for concrete.

The invention has been described with reference to various specific and preferred embodiments and techniques. It will be understood, however, that reasonable modifications of such embodiments and techniques can be made while remaining within the spirit and scope of the invention.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. A process of providing a dye material for application on cured concrete surfaces, said process comprising the steps of:
    (a) packaging a dye composition as a concentrated solute in a container, said concentrated solute containing a defoamer, nonylphenolethoxylate and diethyleneglycol monobutylether;
    (b) transporting said concentrated solute to a work site;
    (c) mixing a quantity in the rang between ten ounces and fourteen ounces of said concentrated solute with an amount in the range between 100 ounces to 150 ounces of water to create a dye composition in water as a carrier that contains said dye composition; and
    (d) application of said dye composition upon a cured concrete surface whereby said process allows said dye material to be easily transported prior to mixture with water.

\* \* \* \* \*